United States Patent [19]

Kiss

[11] Patent Number: 5,723,717
[45] Date of Patent: Mar. 3, 1998

[54] PROCEDURE FOR THE RECOVERY AND/OR CLEANING OF CARBON FORMED AS A RESULT OF COMBUSTION PROCESSES

[75] Inventor: Günter H. Kiss, Minusio, Switzerland

[73] Assignee: Thermoselect AG, Vaduz, Liechtenstein

[21] Appl. No.: 382,608

[22] Filed: Feb. 2, 1995

[51] Int. Cl.[6] .................................................. C10B 47/00
[52] U.S. Cl. .................... 588/213; 423/461; 423/445 R; 502/419
[58] Field of Search ................. 423/418.2, 461, 423/210, 215.5, 445 R; 588/213; 201/14; 502/419, 439

[56] References Cited

U.S. PATENT DOCUMENTS

| | | | |
|---|---|---|---|
| 4,190,636 | 2/1980 | Schmerling et al. | 423/DIG. 10 |
| 4,804,390 | 2/1989 | Lloyd et al. | 423/461 |
| 5,110,359 | 5/1992 | Orac et al. | 423/460 |
| 5,346,679 | 9/1994 | Osaki et al. | 423/418.2 |
| 5,399,372 | 3/1995 | Grimes et al. | 427/131 |

FOREIGN PATENT DOCUMENTS

| | | |
|---|---|---|
| 2834717 | 2/1979 | Germany . |
| 2815329 | 10/1979 | Germany . |

OTHER PUBLICATIONS

*Römpps Chemie–Lixikon*, Franckh'sche Verlagshandlung Stuttgart, 1972, p. 414 no month.
*Römpps Chemie–Lexikon*, Franckh'sche Verlagshandlung Stuttgart, 1975, p. 3423 no month.

*Primary Examiner*—Michael Lewis
*Assistant Examiner*—Stuart L. Hendrickson
*Attorney, Agent, or Firm*—Howard & Howard

[57] ABSTRACT

A procedure for the recovery and/or cleaning of carbon formed as a result of thermal processes. This carbon is present with supernatant C in equilibrium with $CO_2$ and CO (Boudouard equilibrium) after being transformed into $CO_2$ with oxygen in a synthesis gas at an elevated temperature. In so doing, the synthesis gas is brought to a temperature higher than 800° and then, using $H_2O$, abruptly cooled to a temperature less than 100° C., the carbon-water-dispersion is also used as an adsorption agent and the contaminants and residue are bound together in the waste gases, the carbon-water-dispersion is concentrated, the carbon sludge forming at the elevated temperature, preferably greater than 1200° C., is dried. During the drying process the contaminants or contaminant components are vaporized from the carbon sludge and then condensed and the dried carbon is returned to the initial combustion process.

4 Claims, No Drawings

PROCEDURE FOR THE RECOVERY AND/OR CLEANING OF CARBON FORMED AS A RESULT OF COMBUSTION PROCESSES

TECHNICAL FIELD

The invention concerns a procedure for the recovery and/or cleaning of carbon formed as a result of thermal processes and its use as an adsorption agent, as well as the use of a similar procedure during the carburization of carbon produced by the degassing of organic waste components. The invention also concerns a procedure for the cleaning of activated carbon filters.

BACKGROUND ART

Both during the gasification of coal and the carburization of carbon obtained by the degassing of organic waste components with technically pure oxygen, $CO_2$ is formed, whereby, at an elevated temperature, this $CO_2$ with supernatant C is in equilibrium with CO (Boudouard equilibrium). At the same time the carbon can also be formed by the cracking of organic compounds. In view of increasingly strict environmental regulations and an economical management procedure it is, nevertheless, uneconomical not to utilize important components in the process gases.

It is the mission of this invention to make available a procedure that makes it possible to form carbon as a component of hot synthesis gases and to enable a recovery.

SUMMARY OF THE INVENTION AND ADVANTAGES

The invention relates to a process to recover carbon from synthesis gas comprising the steps of elevating the synthesis gas to a temperature greater than 800° C., chilling the synthesis gas with water at no less than 100° C., using a carbon-water dispersion formed as an absorptive agent for binding pollutants and residues in the flue gas, concentrating the carbon-water dispersion, drying the arising carbon slurry at increased temperature greater than 1200° C., evaporating and then concentrating contaminants during the drying process, and recycling dried carbon back into the combustion process.

The invention also contemplates a process for cleaning active charcoal filters comprising the steps of producing a carbon-water dispersion, concentrating the carbon-water dispersion, drawing the arising carbon slurry at elevated temperature approximately 1600° C., vaporizing the pollutants, and submitting the pollutants which can not be volatilized to a substance conversion and then removing as stable systems in molten-fluid phase.

DETAILED DESCRIPTION OF THE PREFERRED EMBODIMENT

As concerns the invention, it was found that through a specific procedure, in which gaseous carbon compounds are rapidly decomposed in the presence of catalytically active metals and metal compounds, a carbon forms that can be separated and returned. This carbon can be used as an adsorption agent and at the same time binds the contaminants and residue entailed in the process. The carbon can then be returned to the initial process through separate cleaning steps.

The carbon needed for the invention procedure can come from various thermal processes, for example, from the gasification of coal or also from the carburization of organic waste components. In conformity with the invention, this carbon is then transformed with pure oxygen into $CO_2$. The temperatures of at lease 800° C., but preferably over 1200° C., that develop as a result of the coal gasification with pure oxygen result in $CO_2$ being transformed according to the Boudouard equilibrium preponderantly into carbon monoxide. Here the composition of the gas mixture in the Boudouard equilibrium is as follows:

|      | 450° | 600° | 700° | 800° | 900° | 1000° |
|------|------|------|------|------|------|-------|
| $CO_2$: | 98   | 77   | 42.3 | 6    | 2.8  | 0.7   |
| CO:  | 2    | 23   | 57.7 | 94   | 97.2 | 99.3  |

Accordingly, it is guaranteed that at temperatures over 800° C., but preferably at temperatures over 1200° C., the equilibrium is shifted almost completely to the side of CO.

When the hot synthesis gases are abruptly cooled to a temperature less than 100° C., but preferably to 90° C., the CO components are transformed back into $CO_2$, whereby the carbon is obtained in a finely divided form.

In a preferred form of execution the hot synthesis gas is cooled to 90° C. by spraying in cold water. The finely divided carbon obtained by means of the retransformation now forms a fine dispersion with the quench water. This dispersion, as a result of the large specific area of the carbon particle, possesses excellent properties for the absorption of the contaminants and residues present in the water.

In conformity with the invention the carbon is recovered from the dispersion. In addition, the carbon particles laden with contaminants and residue are concentrated and drawn off in the form of watery sludge.

The watery sludge is then subjected to a thermal process at a temperature of at least 1200° C., preferably at a temperature of up to 1600° C.

During this drying process the volatile contaminant components are vaporized and then separated. An especially preferred form of execution provides that a fractional vaporization takes place and thus the contaminants are selectively condensed.

The remaining carbon is again subjected to the thermal treatment.

In a preferred form of execution it is provided that contaminants that are not suitable for vaporization are subjected to a material transformation and withdrawn from the furnace as stable systems in molten phase. Thus, it is also guaranteed that the contaminants that are not suitable for vaporization are separated and not returned to the initial process.

The procedure described can be applied in conformity with the invention as regards those process features concerning the cleaning of carbon and also as regards the cleaning of activated carbon filters. Accordingly, activated carbon filters can be cleaned by a process whereby a dispersion with water is produced and then, as already described, this dispersion is concentrated, dried, and the volatile components are vaporized and the carbon then obtained is again used as an activated carbon filter. The drying also takes place at an elevated temperature, preferably at a temperature of circa 1600° C.

The invention is described in greater detail using an example of the carburization of carbon obtained by the degassing of organic waste components using technically pure oxygen.

EXAMPLE

During the treatment of 3000 kg of household waste per hour 2750 $Nm^3$ of raw synthesis gas were produced that, among other things, contained 760 kg of $CH_4$, and 2 kg of carbon, as well as melted particles from the carburization and cracking process. By mean of purposefully influenced quenching conditions as additional 4.5 kg of carbon with a maximum particle size of 10 μm formed during the cooling of the gas.

After passing through a baffle plate thickener and after flocculants were added the carbon concentrate was brought to a dry substance content of circa 90%, i.e., 7.4 kg, by means of a Fundabac filter.

After vacuum treatment of the concentrate the weight loss as a result of the evaporation of the moisture contained in the concentrate and of the residue and contaminants adsorbed by the carbon totalled 1.5 kg.

The amount of non-evaporated residue and contaminants was 300 g. These residues are subjected to a material transformation and withdrawn from the furnace as stable systems in molten form.

I claim:

1. A process for treating gases obtained during the reclamation of carbon-containing waste materials, comprising the steps of: degassing carbon-containing waste materials and diverting the gases therefrom; gasifying the remaining organic components of the waste materials at a temperature of at least 800° C. and collecting the gases therefrom together with the gases from said degassing step; chilling the collected gases below 100° C. with a cooling water spray to obtain deposits of activated carbon; forming a dispersion of the activated carbon in the cooling water which binds any noxious substances in the collected gases; concentrating the dispersion to form a carbon sludge; drying the carbon sludge to form residual carbon while evaporating off any noxious substances; and recycling the residual carbon into the carbon-containing waste materials prior to said gasifying step.

2. A process according to claim 1, further including maintaining the drying temperature for the carbon sludge at approximately 1600° C.

3. A process according to claim 2, further including separating any contaminants from the dispersion using a flocculant.

4. A process according to claim 3, wherein said step of evaporating off any noxious substances in the carbon sludge includes fractional vaporization.

* * * * *